Feb. 28, 1950   H. PFENNINGER   2,499,108
ARRANGEMENT FOR THE UTILIZATION OF TURBINE EXHAUST
GASES IN STEAM GENERATORS AND AIR PREHEATERS
Filed June 11, 1946

Inventor:
Hans Pfenninger,

By Pierce & Scheffler,
Attorneys.

Patented Feb. 28, 1950

2,499,108

UNITED STATES PATENT OFFICE 2,499,108

ARRANGEMENT FOR THE UTILIZATION OF TURBINE EXHAUST GASES IN STEAM GENERATORS AND AIR PREHEATERS

Hans Pfenninger, Baden, Switzerland, assignor to Aktiengesellschaft Brown, Boveri & Cie, Baden, Switzerland Application June 11, 1946, Serial No. 676,062
In Switzerland June 21, 1945

4 Claims. (Cl. 60—2)

It is known to utilize the exhaust gases from gas turbines to produce steam, this steam being used in steam turbines or heating plants after the exhaust gases have already been passed through a preheater for the combustion air of the gas turbine, so that the heat in the exhaust gases is utilized in two successive stages. This arrangement possesses the advantage that no valves are required in the exhaust gas pipe but on the other hand there is the serious disadvantage that both heat exchangers, namely the one for preheating the air and the other one for producing the steam, have always the same amount of gas flowing through them, so that the ratio of the heat quantities transferred in these heat exchangers for the selected heat exchanging surfaces is definitely fixed for each load.

It is more favorable when according to the invention the exhaust gases are made to flow in two part-streams parallel to these heat utilizing points and the ratio of their quantities can be varied as desired by means of a control device.

The exhaust gas from the gas turbine is expediently divided into two streams provided with at least one control device, one of these streams being passed to the preheater for the combustion air and the other to the waste heat boiler.

Figure 1:
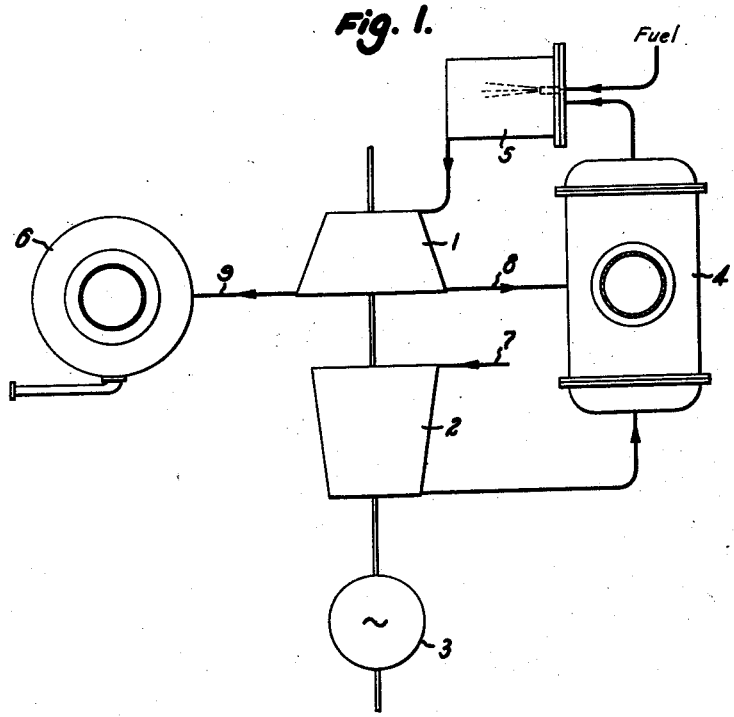
Figure 2:
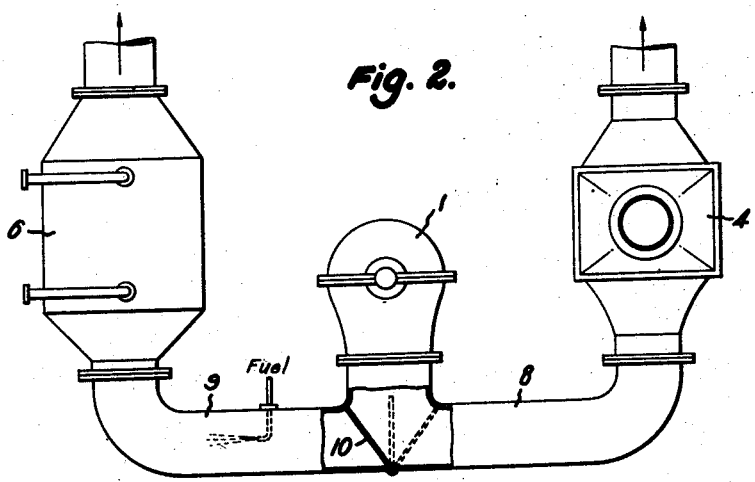

A constructional example of the invention is illustrated in the accompanying drawing where Fig. 1 shows a gas turbine plant diagrammatically in plan and Fig. 2 an elevation of the essential elements of this plant.

In Fig. 1 reference numeral 1 indicates a gas turbine, 2 is the compressor driven by the turbine 1, 3 is an electric generator on the same shaft for producing useful power, 4 is an air preheater, 5 a combustion chamber, and 6 a waste heat boiler for generating steam. The open circuit for the working medium is as follows: air enters the compressor 2 at 7 and is preheated in the preheater 4, after which together with the fuel it passes to the combustion chamber 5 where ignition occurs. The resulting hot gases flow to the gas turbine 1 and do work there. In accordance with the invention the exhaust gases divide into two streams and flow through the controllable pipes 8 and 9 in parallel, one partial stream flowing to the preheater 4 for the combustion air and the other partial stream flowing to the waste heat boiler 6 for generating steam, after which the gases either pass to the atmosphere or to some further point where they are used.

The ratio of the quantities of the partial exhaust gas streams is controlled for instance as shown in Fig. 2. A control element 10 at the dividing point can be so adjusted that any desired ratio of division can be obtained.

If for instance pipe 9 is completely closed so that the plant operates without generating any steam, all the exhaust gases will flow through pipe 8 to preheater 4 and the plant operates with maximum thermal efficiency, referred to the electrical power which is produced. The air will for instance enter the preheater at about 200° C. and will be heated there up to about 300° C., whereupon the combustion gases flow to the turbine at about 600° C. Nowadays a thermal efficiency of about 26 to 28% is attainable.

If control element 10 is adjusted so as to allow gas to pass through pipe 9 to the boiler 6, preheating of the air by means of the exhaust gases will decrease and more fuel has to be supplied to combustion chamber 5. As the amount of gas passing to boiler 6 increases there will be a corresponding decrease in the preheating of the combustion air, and in order to reach an inlet temperature of 600° C. at the entrance to the turbine the fuel consumption will have to be increased and the thermal efficiency of this side of the plant will drop, whilst the other side, that is the side where steam is generated, will benefit correspondingly.

With combustion turbine plants which have to generate comparatively large quantities of steam at small loads, it is advisable to provide a burner in pipe 9 by means of which the missing heat quantity can be supplied, so that the plant can actually generate the required steam quantity.

I claim:

1. In a system for generating power including a gas turbine plant comprising coupled turbine and compressor units and a steam plant comprising a boiler unit, a pair of branch pipes connected to the exhaust gas outlet of the turbine unit of the gas turbine plant for dividing the exhaust gas into two streams, a pair of heat exchangers supplied respectively by said branch pipes, one of said heat exchangers serving as a preheater for compressed air from the compressor unit of the gas turbine plant and the other to produce steam in the boiler unit of the steam plant, and valve means associated with each of said branch pipes for regulating the flow of exhaust gas therethrough.

2. The invention as defined in claim 1 and which further includes a fuel burner in the branch pipe leading to the heat exchanger for producing steam.

3. In a system for generating power including a gas turbine plant comprising coupled turbine and compressor units and a steam plant comprising a boiler unit, a pair of branch pipes connected to the exhaust gas outlet of the turbine unit of the gas turbine plant for dividing the exhaust gas into two streams, a pair of heat exchangers supplied respectively by said branch pipes, one of said heat exchangers serving as a preheater for compressed air from the compressor unit of the gas turbine plant and the other to produce steam in the boiler unit of the steam plant, and valve means associated with said branch pipes for increasing the flow of exhaust gas through one pipe and simultaneously decreasing the flow of gas through the other pipe.

4. The invention as defined in claim 3 wherein said branch pipes form a junction with a main exhaust pipe leading to the outlet side of the turbine unit, and said valve means is constituted by a vane pivotally mounted at said junction.

HANS PFENNINGER.

REFERENCES CITED

The following references are of record in the file of this patent:

UNITED STATES PATENTS

| Number | Name | Date |
|---|---|---|
| 1,398,946 | Schmidt | Nov. 29, 1921 |
| 2,403,388 | Morey | July 2, 1946 |